(12) United States Patent
Ikeda et al.

(10) Patent No.: US 7,555,194 B2
(45) Date of Patent: Jun. 30, 2009

(54) ILLUMINATION DEVICE AND IMAGE SCANNING DEVICE

(75) Inventors: Makoto Ikeda, Tokyo (JP); Hiroyuki Nemoto, Tokyo (JP); Takashi Kishimoto, Tokyo (JP); Takeshi Ishimaru, Tokyo (JP); Hirohiko Iwase, Tokyo (JP); Hidemitsu Takeuchi, Tokyo (JP); Tomihisa Saito, Tokyo (JP)

(73) Assignee: Nippon Sheet Glass Co., Ltd., Tokyo (JP)

( * ) Notice: Subject to any disclaimer, the term of this patent is extended or adjusted under 35 U.S.C. 154(b) by 236 days.

(21) Appl. No.: 11/296,866

(22) Filed: Dec. 7, 2005

(65) Prior Publication Data

US 2006/0120098 A1 Jun. 8, 2006

(30) Foreign Application Priority Data

Dec. 8, 2004 (JP) ............................. 2004-354878
May 10, 2005 (JP) ............................. 2005-137732

(51) Int. Cl.
*G02B 6/10* (2006.01)

(52) U.S. Cl. ................. 385/146; 362/551; 362/555; 362/231; 362/609; 359/475; 359/484; 359/509

(58) Field of Classification Search ................. 362/610, 362/613, 623–627, 555, 230, 600, 621, 608, 362/619, 603, 551, 628, 330, 615, 601, 606, 362/244, 612, 633, 97, 561, 611, 558, 332, 362/800, 26, 27, 231; 385/146, 140; 359/515; 358/475, 484, 509; 250/216, 227.11, 234
See application file for complete search history.

(56) References Cited

U.S. PATENT DOCUMENTS 4,714,983 A * 12/1987 Lang ......................... 362/27

| | | | |
|---|---|---|---|
| 5,040,098 A * | 8/1991 | Tanaka et al. | 362/634 |
| 6,357,903 B1 * | 3/2002 | Furusawa et al. | 362/555 |
| 6,648,485 B1 * | 11/2003 | Colgan et al. | 362/600 |
| 6,744,033 B2 * | 6/2004 | Ikeda | 250/216 |
| 7,048,427 B2 * | 5/2006 | Fujino et al. | 362/621 |
| 2003/0012036 A1 * | 1/2003 | Uemura et al. | 362/555 |
| 2003/0218874 A1 * | 11/2003 | Fujino et al. | 362/31 |
| 2004/0109664 A1 * | 6/2004 | Ohtsuki et al. | 385/146 |

FOREIGN PATENT DOCUMENTS

| JP | 06-217084 | | 8/1994 |
|---|---|---|---|
| JP | 2003-281913 | | 10/2003 |
| JP | 2003348299 A | * | 12/2003 |
| JP | 2004-146870 | | 5/2004 |

OTHER PUBLICATIONS

Derwent English Abstract of Japanese Publication JP 2003348299 A, Dec. 5, 2003.*

* cited by examiner

*Primary Examiner*—Anabel Ton
*Assistant Examiner*—Kevin Spinella
(74) *Attorney, Agent, or Firm*—Carrier, Blackman & Associates, P.C.; Joseph P. Carrier; William D. Blackman

(57) ABSTRACT

An improved illumination device shortens a redundant area of insufficient light intensity close to a longitudinal end thereof. The device includes a casing, a bar-shaped light guide housed in the casing to cause a light-emitting surface thereof to be exposed, a light-emitting unit secured to an end section of the casing, wherein light from the light-emitting unit is introduced into the bar-shaped light guide through the end face thereof and is totally reflected within the bar-shaped light guide to be emitted through the light-emitting surface, and a shielding section provided to cover an end section of the bar-shaped light guide including the redundant area at the end section of the casing close to the light-emitting unit. A notch is formed at the end section of the bar-shaped light guide on the light-emitting surface side close to the light-emitting unit, and light from the light-emitting unit is reflected on a rear surface of the shielding section through a gap between this notch and the light-emitting unit to be introduced into the bar-shaped light guide.

6 Claims, 10 Drawing Sheets

(a)

(b)

(a)　　　　　(b)　　　　　(c)

(a)

(b)

(c)

ILLUMINATION DEVICE AND IMAGE SCANNING DEVICE

CROSS-REFERENCE TO RELATED APPLICATIONS

The present invention claims priority under 35 USC 119 based on Japanese patent application numbers 2004-354878, filed 08 Dec. 2004, and 2005-137732, filed 10 May 2005, the entire content of which are incorporated herein by reference.

BACKGROUND OF THE INVENTION

1. Field of the Invention

The present invention relates to an illumination device for illuminating a document and an image scanning device (image sensor) in which the illumination device is incorporated.

2. Description of the Prior Art

A facsimile machine, a copying machine, a scanning device and the like are provided with an illumination device in which a bar-shaped light guide for irradiating a line-shaped light on a document is incorporated, and with an image scanning device provided with a lens array for causing the reflected light beams from the document to focus onto a line image sensor.

As shown in Patent Document 1 and FIG. 12, the illumination device is generally constructed in such a manner that the bar-shaped light guide 101 is fitted into a casing 100 with a C-shaped cross-section, and light from a light-emitting unit 102 secured to an end section of the casing is introduced into the bar-shaped light guide through the end face thereof and is caused to be totally reflected within the bar-shaped light guide and emitted from a light-emitting surface of the light guide Referring to Patent Document 1, as shown in FIG. 13, a bottom section of the bar-shaped light guide 101 is provided with a scattering pattern 103 coated with a white paint and the like and each light-emitting element 102a, 102b and 102c of three primary colors of the light-emitting unit 102 is disposed by offsetting relative to a normal line from this bottom surface.

As a structure to prevent the bar-shaped light guide from dropping out from the casing, FIG. 4 of Patent Document 2 discloses that an engaging section is provided at an end section of the casing close to the light-emitting unit. Patent Document 3 also discloses a structure whereby a casing is divided in two parts in the longitudinal direction to prevent a gap from being formed between the end section of the casing and the light-emitting unit under the influence of heat.

[Patent Document 1] Japanese Patent Application Publication No. 6-217084

[Patent Document 2] Japanese Patent Application Publication No. 2003-281913

[Patent Document 3] Japanese Patent Application Publication No. 2004-146870

In the case where the light-emitting elements of three primary colors are offset relative to the normal line from the bottom surface of the bar-shaped light guide as in Patent Document 1, the shape of the bar-shaped light guide becomes flat and as a result, the shape of the illumination device is also affected by the shape of light guide.

On the other hand, when each light-emitting element of three primary colors is disposed along the normal line from the bottom surface of the bar-shaped light guide, there are problems as described in FIGS. 14 and 15.

FIGS. 14 (a) through (c) are views describing the condition in which light from a blue-color light-emitting element 102a, a red-color light-emitting element 102b, and a green-color light-emitting element 102c are incident on the bar-shaped light guide 101, wherein light from each light-emitting element has light distribution characteristics of 180 degrees just before entering the bar-shaped light guide. However, when light is incident on a light guide made of acrylic, a radiation angle of the light from each light-emitting element has a spread of 84 degrees by Snell's law.

FIG. 15 is a graph showing the relationship between displacement and light intensity of each light-emitting element in the main scanning direction (in the longitudinal direction of the light guide). As described above, since the radiation angle of light from each light-emitting element within the bar-shaped light guide 101 is equal (about 84 degrees), the light intensity of the blue-color light-emitting element 102a which is far from the bottom surface of the bar-shaped light guide 101 does not go over 80% unless a distance more than 5 mm is kept from the incident end face of the bar-shaped light guide 101. Thus, when even one color has insufficient light intensity, that section becomes a redundant area which cannot be used as a light source.

In the conventional technology, the redundant area is long and the length of a section useless as the illumination device is great. Those problems can not be solved by the structures disclosed in Patent Documents 2 and 3.

SUMMARY OF THE INVENTION

It is therefore an object of the present invention to provide an improved illumination device which has a short redundant area, and an improved image scanning device in which such an improved illumination device is incorporated.

To solve the problems described above, an illumination device according to a first aspect of the invention is provided, which comprises a casing, a bar-shaped light guide housed in the casing to cause a light-emitting surface thereof to be exposed, a light-emitting unit secured to an end section of the casing, wherein light from the light-emitting unit is introduced into the bar-shaped light guide through the end face thereof and is totally reflected within the bar-shaped light guide to be emitted through the light-emitting surface, and a shielding section is provided to cover an end section of the bar-shaped light guide at the end section of the casing close to the light-emitting unit and on the light-emitting surface side of the bar-shaped light guide, a notch is formed at the end section of the bar-shaped light guide on the light-emitting surface side close to the light-emitting unit, and light from the light-emitting unit is reflected on a rear surface of the shielding section through a gap between this notch and the light-emitting unit to be introduced into the bar-shaped light guide.

An illumination device according to a second aspect of the invention is provided, which comprises a casing, a bar-shaped light guide housed in the casing to cause a light-emitting surface thereof to be exposed, a light-emitting unit including multiple light-emitting elements and secured to an end section of the casing, wherein light from the light-emitting unit is introduced into the bar-shaped light guide through the end face thereof and is totally reflected within the bar-shaped light guide to be emitted through the light-emitting surface, and the end face of the bar-shaped light guide facing the light-emitting unit is provided with a section to enlarge the incident angle when light from at least one said light-emitting element is incident on the bar-shaped light guide at a location facing at least the light-emitting element which is furthest from a bottom surface of the bar-shaped light guide.

The illumination device according to the present invention is especially effective when each light-emitting element of three primary colors included with the light-emitting unit is disposed in the direction of a normal line from the center line of the bottom surface in the width direction of the bar-shaped light guide.

Available as the section to enlarge the incident angle when light from the light-emitting element specified by the illumination device according to claim 2 is incident on the bar-shaped light guide is at least one of semispherical concave surface, a halved cylindrical concave surface, a semispherical convex surface, a halved cylindrical convex surface, a saw-tooth concave surface, a saw-tooth convex surface, a rough surface or the like.

An image scanning device according to the present invention comprises the illumination device described above, and an erecting unit magnification imaging system (lens array) to cause the reflected light beams from a document of the light emitted from this illumination device to focus onto a line image sensor.

The image scanning device may be such that the erecting unit magnification imaging system has a focal depth of 1 mm or more and the illumination irregularity of the illumination device in the focal depth range is within ±20%. In this case, the focal depth range means a range on the light axis in which a modulation degree (m) when a black-and-white periodic pattern of a spatial frequency 61 p (line pair)/mm is given the erecting unit magnification imaging is 10% or more.

The black-and-white periodic pattern of 61 p (line pair)/mm is selected here as the spatial frequency (i.e., quantity to show fineness of a periodic structure forming an image) because this scale is generally used to measure the modulation degree.

The modulation degree is an index to show the depth of modulation. If the maximum value of the light intensity subject to modulation is I max and the minimum value thereof is I min, (m)=(I max−I min)/(I max+I min). In the present invention, the range on the light axis in which the modulation degree becomes 10% or more is set as the focal depth range because this is a limit value which a human being can clearly judge. If the modulation degree is less than 10%, we can not judge clearly.

In claim 6, the erecting unit magnification imaging system is set to provide a focal depth of 1 mm or more. It is necessary to provide the focal depth of 1 mm or more to scan the image correctly even though there are wrinkles or fold lines on the document. To scan even a back margin of a book without any problem, it is desirable that the focal depth be 1.6 mm or more.

It is also desirable that the illumination irregularity be as small as possible in the focal depth range. In the present invention, the illumination irregularity is set to be within ±20% because electric correction can not be made if the illumination irregularity is beyond 20%.

As an erecting unit magnification imaging system which can easily exhibit the characteristics described above, a structure whereby a plurality of lens plates is superposed and each lens plate is regularly provided with a number of minute lenses at a given pitch in a two-dimensional manner can be considered, but it is not limited to this structure.

BRIEF DESCRIPTION OF THE DRAWINGS

The above and other objects, features and advantages of the present invention will become more apparent from the following description when taken in conjunction with the accompanying drawings.

DETAILED DESCRIPTION OF THE PREFERRED EMBODIMENTS

Figure 1:
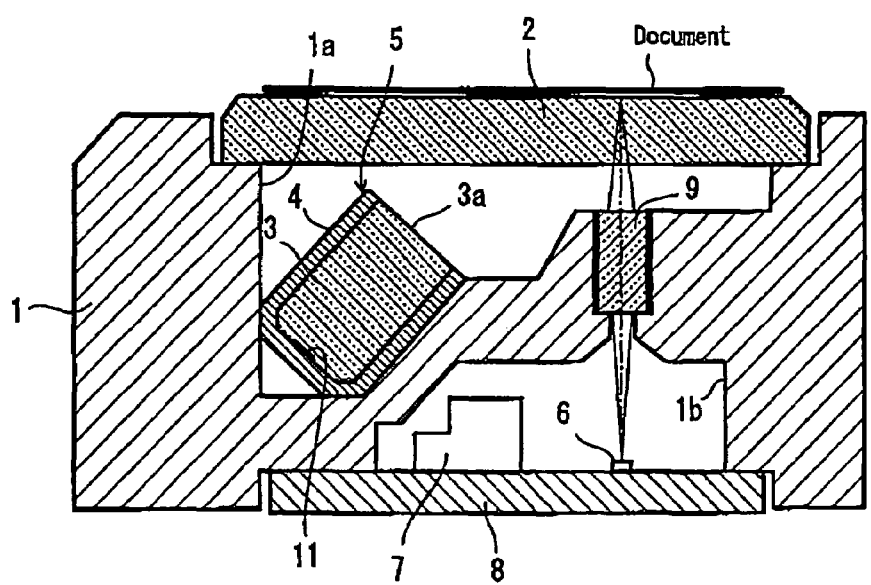
FIG. 1 is a cross-sectional view of an image scanning device in which an illumination device according to the present invention is incorporated.
Figure 2:
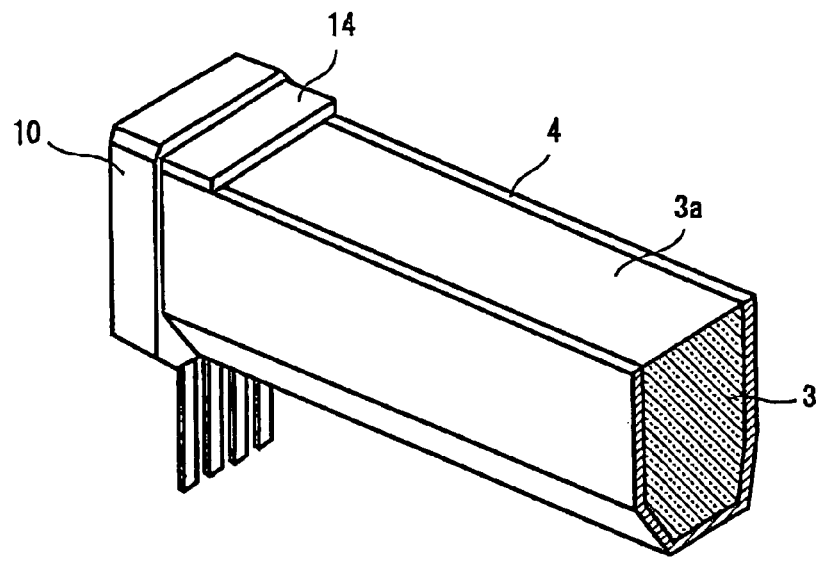
FIG. 2 is a perspective view showing a substantial part of the illumination device.
Figure 3:
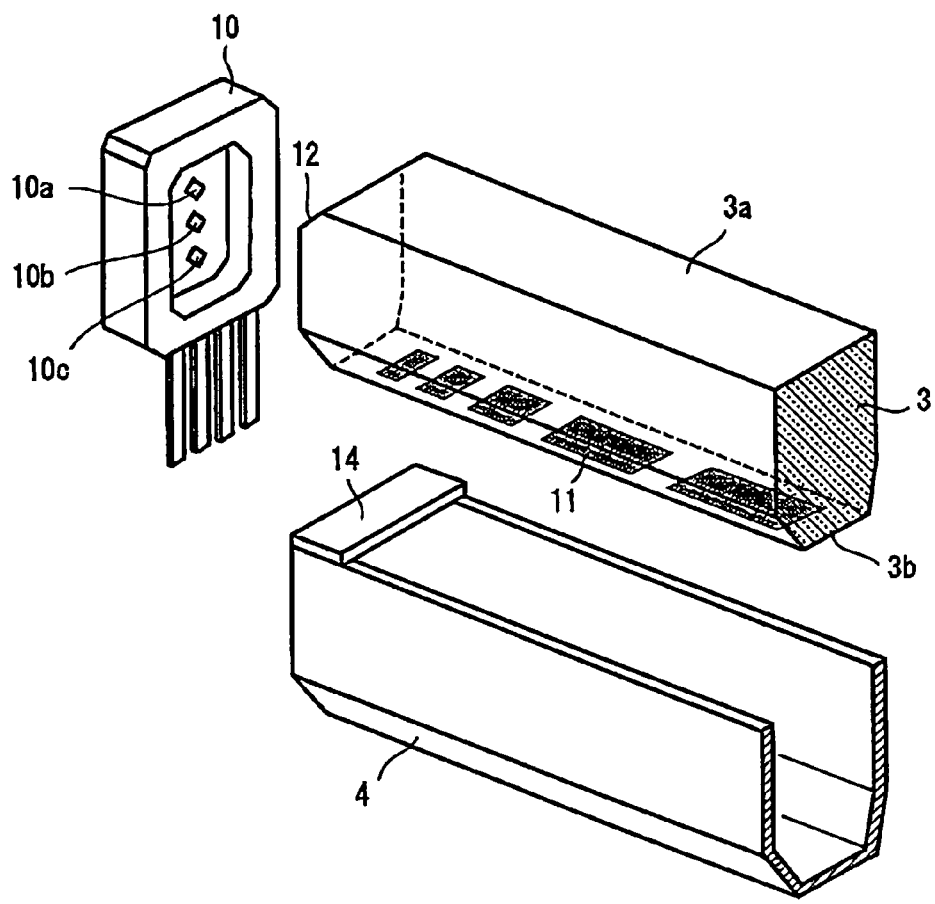
FIG. 3 is an exploded perspective view showing the substantial part of the illumination device.

Preferred embodiments of the present invention will now be described with reference to the accompanying drawings. FIG. 1 is a cross-sectional view of an image scanning device in which an illumination device according to the present invention is incorporated. FIG. 2 is a perspective view showing a substantial part of the illumination device and FIG. 3 is an exploded perspective view showing the substantial part of the illumination device.

An image scanning device comprises a frame 1 provided with a concave section 1*a* and a concave section 1*b*, a transparent top plate 2 adapted to cover the upper surface of the concave section 1*a* and to mount a document thereon, a bar-shaped light guide 3 housed in a casing 4 to form a line illuminating device 5 which is obliquely secured within the concave section 1*a*, a substrate 8 situated within the concave section 1*b* and provided with a line image sensor (photoelectric transfer element) 6 and a drive circuit 7, and a lens array 9 for 1:1 imaging held within the frame 1.

With this arrangement, the document mounted on the top plate 2 is irradiated by light emitted from a light-emitting surface of the line illuminating device 5 and the reflected light is caused to be incident on the image sensor 6 arranged in a line shape by the lens array 9.

The casing 4 of the line illuminating device 5 is formed in a U-shape in its cross-section and the bar-shape light guide 3 is fitted into the opening of the casing 4 to allow the light-emitting surface 3a to be exposed. A light-emitting unit 10 is fixed to one end of the casing 4. A blue-color element 10a, a red-color element 10b, and a green-color element 10c are secured to the light-emitting unit 10 at regular intervals along a normal line from the center line of a bottom surface 3b in the width direction of the bar-shaped light guide 3.

The bar-shaped light guide 3 is formed from a transparent resin such as acrylic. One end face of the bar-shaped light guide 3 is situated to face the light-emitting unit 10 and the bottom surface 3b thereof is provided with a scattering pattern 11 for allowing the light incident from the end face to reflect diffusely. The scattering pattern 11 is provided by applying a white paint or forming an irregularity (concavity and convexity).

A notch 12 is formed at an end section of the bar-shaped light guide 3 on the light-emitting surface 3a side close to the light-emitting unit 10. With this notch 12, a gap 13 is formed between the light-emitting unit 10 and the end face of the bar-shaped light guide 3. Referring to the notch 12, any shape will do as far as the gap 13 is formed. For example, by providing a shorter light guide 3 than a normal light guide, a gap can also be formed between the light-emitting unit 10 and the end section of the light guide.

Further, a shielding section 14 is provided to cover the notch 12. This shielding section 14 is integrally formed with the casing 4, but can be formed integrally with or separately from the light-emitting unit 10. It is desirable that the shielding section 14 be made of material with high reflectance. It is also desirable that at least a section of the shielding section 14 reflecting the light emitted from the light-emitting unit 10 have higher reflectance. For example, metal or white resin with high reflectance can be used as the shielding section 14.

Figure 4:
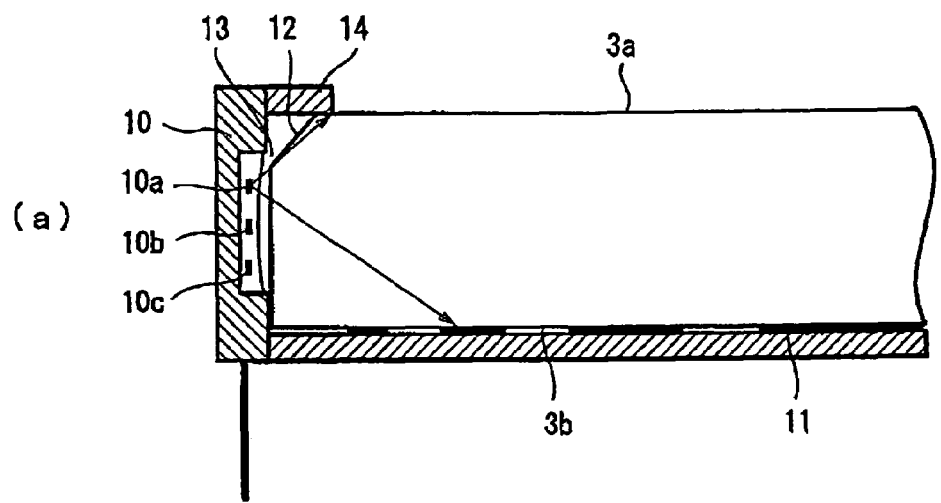
FIGS. 4 (*a*) and (*b*) are views describing the condition in which light from a blue-color light-emitting element of the illumination device according to the present invention is incident on a bar-shaped light guide.
Figure 4:
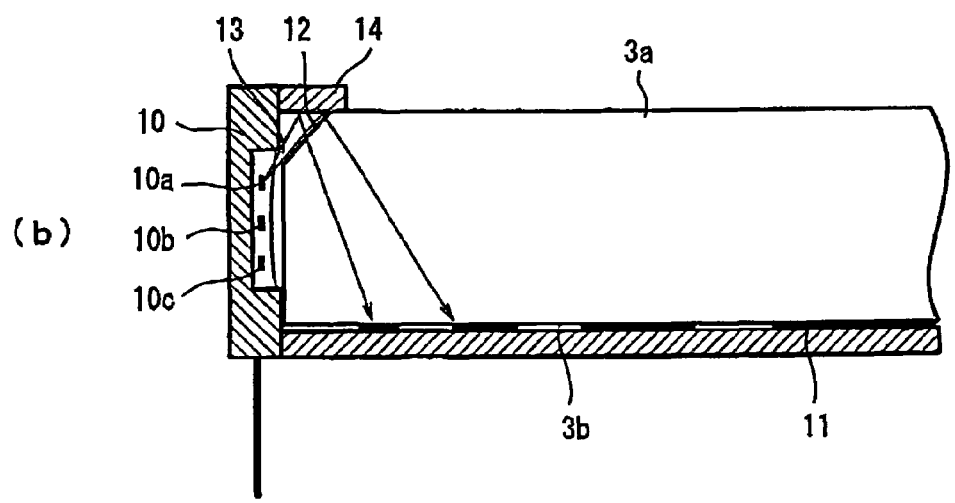

As shown in FIG. 4 (a), the light emitted from a blue-color element 10a, which is furthest from the bottom surface 3b of the bar-shaped light guide 3, of the light-emitting elements of the light-emitting unit 10 and entering the light guide directly from the end face of the light guide 3 as in the past has a long redundant area. However, as shown in FIG. 4 (b), the light emitted from the blue-color element 10a and passing through the gap 13 is reflected on a rear surface of the shielding section 14 to enter the light guide 3 from the surface of the notch 12. Since the reflected light from this shielding section 14 become almost perpendicular, the redundant area becomes quite short.

Since the light from the blue-color element 10a is combined with the light of the red-color element 10(b) and the green-color element 10(c) also shown in FIGS. 4 (a) and (b), the redundant area becomes shorter as a whole.

Figure 5:
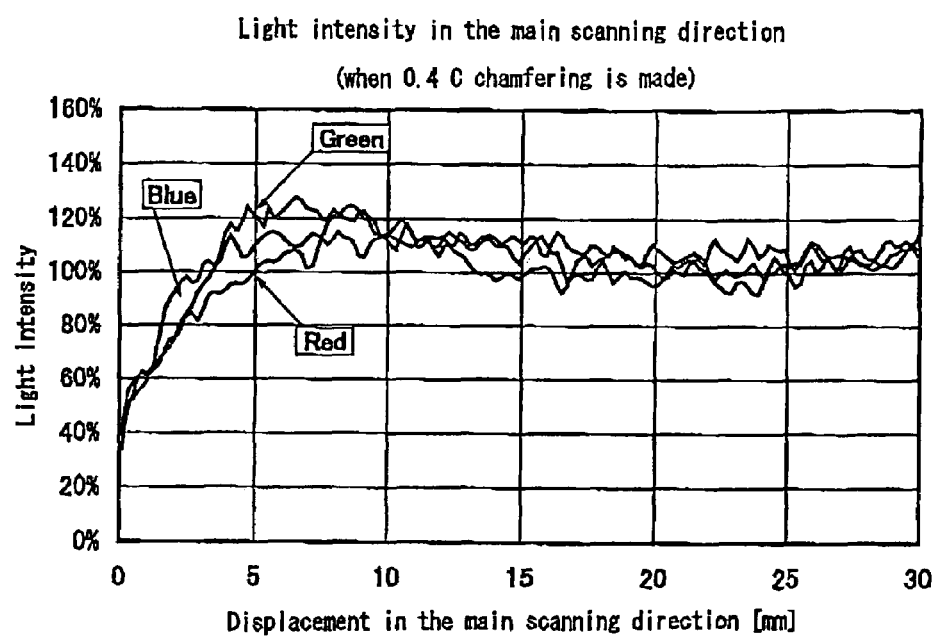
FIGS. 5 is a graph showing the relationship between displacement and light intensity of each light-emitting element in the main scanning direction of the illumination device according to the present invention.
Figure 15:
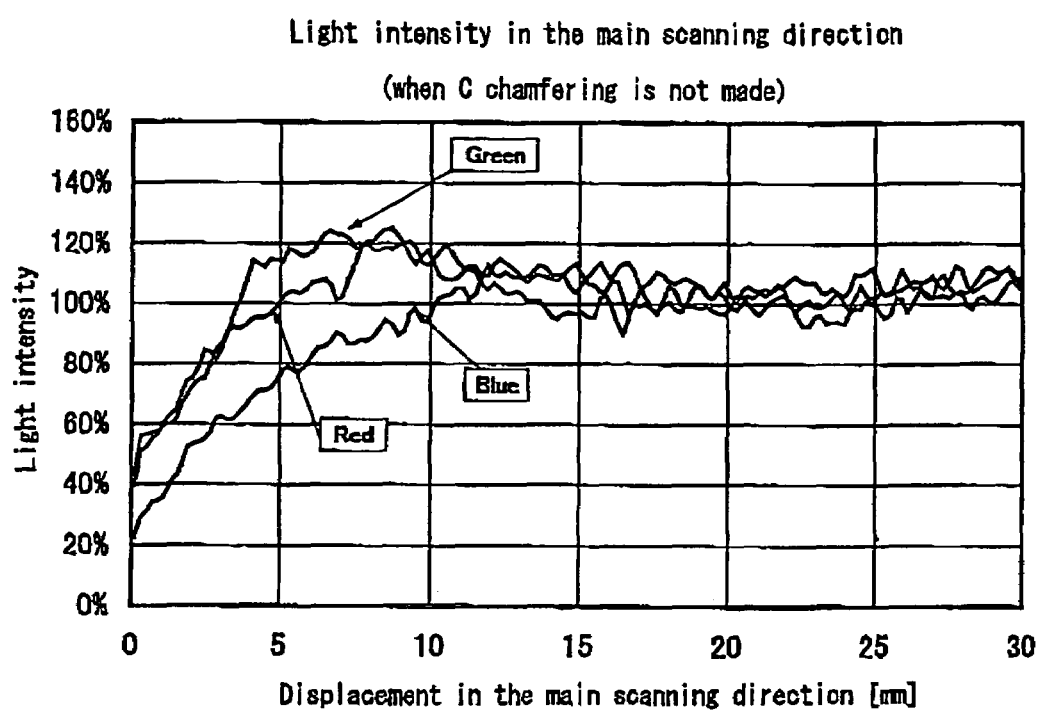
FIG. 15 is a graph showing the relationship between displacement and light intensity of each light-emitting element in the main scanning direction of the conventional illumination device.

FIG. 5 is a graph showing the relationship between displacement and light intensity of each light-emitting element in the main scanning direction of the illumination device according to the present invention. As is obvious from a comparison between FIG. 5 and FIG. 15, the light intensity of the blue-color element 10a at a place close to the gap 13 rises sharply at a location close to the end face of the light guide and is almost at the same level as the light intensity of the remaining red-color element 10b and green-color element 10c. Accordingly, the length of the redundant area is reduced to almost half of the conventional length.

Figure 6:
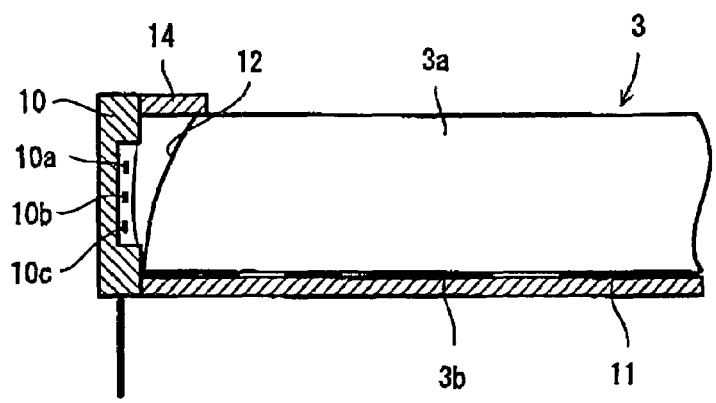
FIG. 6 is a view similar to FIGS. 4(*a*), 4(*b*) showing another embodiment.

FIG. 6 is a view similar to FIG. 4 showing another embodiment. In the embodiment described above, the notch 12 is linearly formed, but in this embodiment, the notch 12 is formed in a curve. By making the notch 12 linear, it is possible to keep the balance of each color as described above, but it is possible to control the directional characteristics of each color by making the notch 12 curved.

Figure 7:
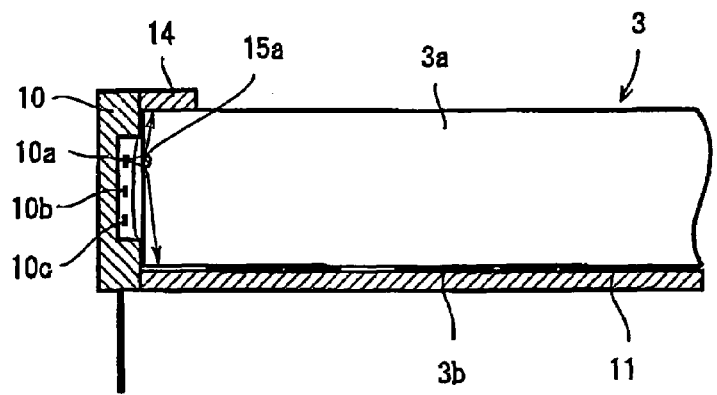
FIG. 7 is a view similar to FIGS. 4(*a*), 4(*b*) showing still another embodiment.
Figure 8:
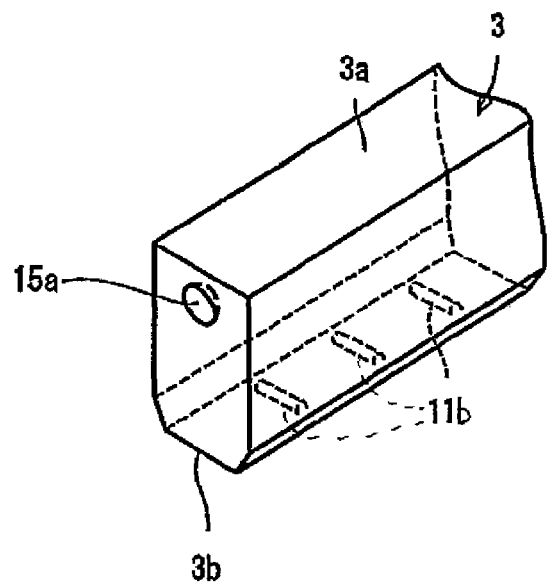
FIG. 8 is a perspective view showing an end face of a light guide of an illumination device according to a further embodiment similar to the embodiment of FIG. 7.

FIG. 7 is a view similar to FIG. 4 showing still another embodiment and FIG. 8 is a perspective view showing an end face of a light guide of the embodiment shown in FIG. 7. In this embodiment, the notch is not formed, but the end face of the bar-shaped light guide 3 is formed flat. A semispherical concave surface 15a is formed, as a part to enlarge the incident angle of the light incident on the bar-shaped light guide, on the surface of the end face facing the blue-color element 10a. Referring to the scattering pattern 11, a halved cylindrical concave surface is formed on the bottom surface 3b in this embodiment.

By forming this semispherical concave surface 15a, part of the light from the blue-color element 10a is refracted outwards to expand when entering the bar-shaped light guide 3 through the semispherical concave surface 15a. The light entering the light guide directly from the end face of the light guide 3 not through the semispherical concave surface 15a has a long redundant area, but the incident light through the semispherical concave surface becomes almost perpendicular and as a result, these light beams are combined to make the redundant area extremely short.

Figure 9:
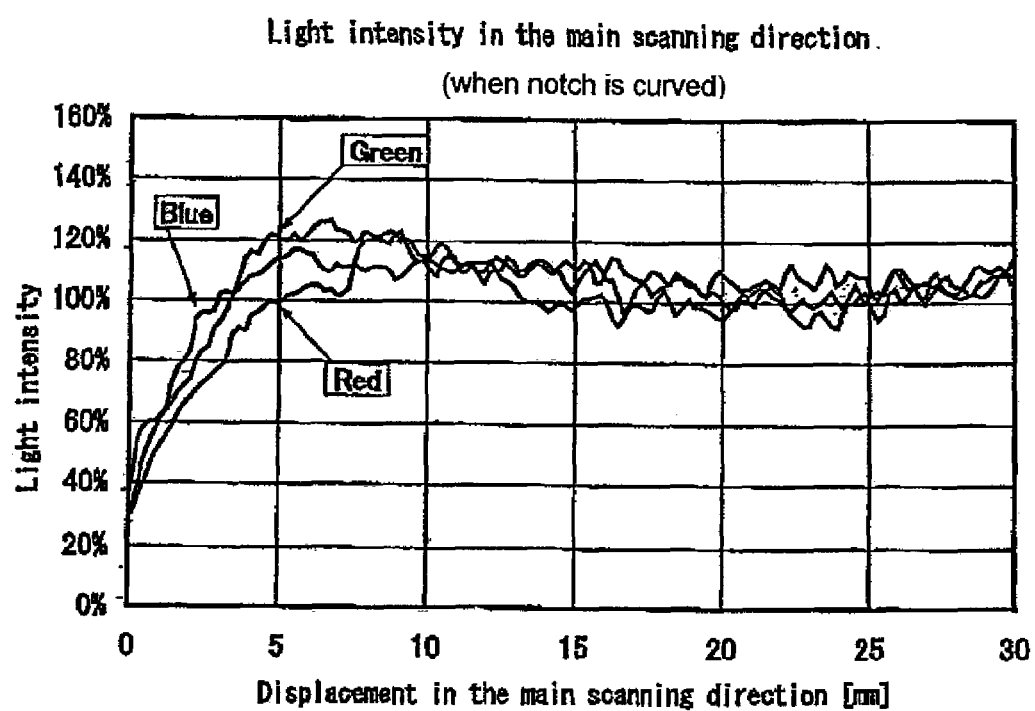
FIG. 9 is a graph showing the relationship between displacement and light intensity of each light-emitting element in the main scanning direction of the illumination device according to the embodiment of FIG. 6.

FIG. 9 is a graph showing the relationship between displacement and light intensity of each light-emitting element, in the main scanning direction, of the illumination device according to the embodiment as shown in FIG. 6. According to this graph, the illumination device according to this embodiment also has a redundant area of which the length is almost half of the conventional length as in the previous embodiment.

Figure 10:
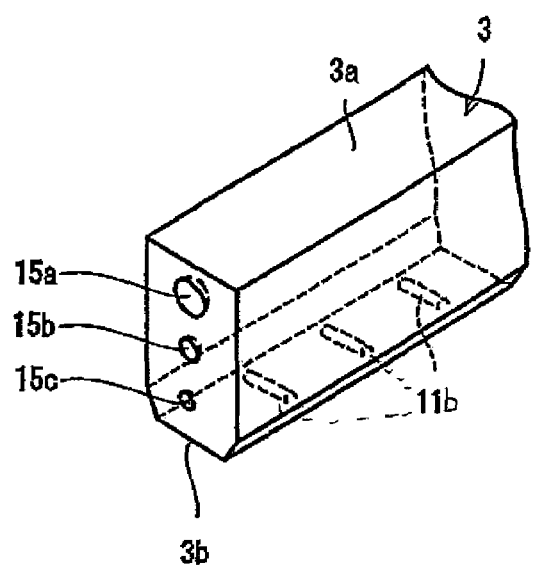
FIG. 10 is a perspective view showing an end face of a light guide of an illumination device according to still another embodiment.

FIG. 7 is a view similar to FIG. 4 showing still another embodiment. FIG. 8 is a perspective view showing an end face of a light guide showing yet another embodiment, similar to the embodiment shown in FIG. 7. In these embodiments, the notch is not formed, but the end face of the bar-shaped light guide 3 is formed flat. A semispherical concave surface 15a is formed, as a part to enlarge the incident angle of the light incident on the bar-shaped light guide, on the surface of the end face facing the blue-color element 10a. Referring to the scattering pattern 11, a halved cylindrical concave surface is formed on the bottom surface 3b in the embodiment of FIG. 7. The embodiment of FIG. 8 includes a plurality of halved cylindrical concave surfaces 11b disposed along the bottom surface 3b of the light guide 3 that act as light scattering devices, in a similar manner to the painted light-scattering pattern 11 of the embodiment shown in FIG. 3. This arrangement of halved cylindrical concave surfaces 11b disposed on the bottom surface 3b of the light guide 3 is also shown in FIGS. 10 and 11.

In the embodiment as shown in FIG. 11(a), halved cylindrical concave surfaces 15d and 15e are formed as sections to enlarge the incident angle of light incident on the bar-shaped light guide. A semispherical convex surface, a halved cylindrical convex surface or rough surface can also be formed in place of the semispherical concave surface or the halved cylindrical concave surface as shown in the figure.

Figure 11:
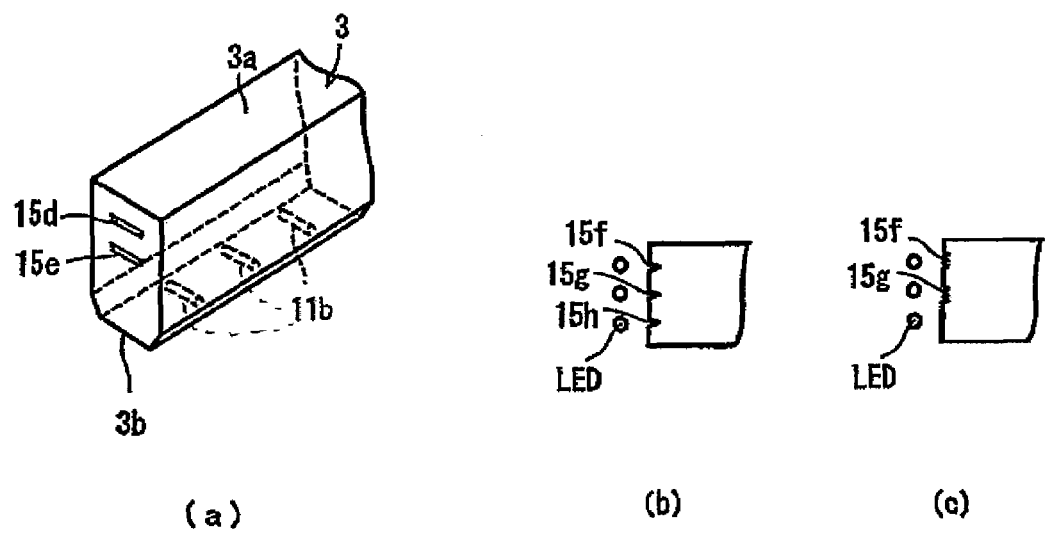
FIGS. 11 (*a*) through (*c*) are views showing an end face of light guides of an illumination device according to still other embodiments of the present invention.

In an embodiment as shown in FIG. 11 (b), saw-tooth concave surfaces 15f, 15g and 15h are formed as a part to enlarge the incident angle of light incident on the bar-shaped light guide. In an embodiment as shown in FIG. 11 (c), concave surfaces 15f and 15g provided with continuous minute saw-tooth concave surfaces are formed. A saw-tooth convex surface can also be used in place of the saw-tooth concave surface.

EFFECTS OF THE INVENTION

According to the present invention, a redundant area of an illumination device in which a bar-shaped light guide is incorporated can be shortened. In this manner, even though the length of the illumination device is shortened, it is possible to obtain the light intensity equivalent to the conventional device. Since the interference with another device becomes less, it is advantageous in terms of design.

INDUSTRIAL APPLICABILITY

An illumination device and an image scanning device according to the present invention can be incorporated and effectively used in a copying machine, a facsimile machine, and the like.

Although there have been described what are the present exemplary embodiments of the invention, it will be understood that variations and modifications may be made thereto within the spirit and scope of the appended claims.

What is claimed is:

1. An illumination device comprising
    a casing,
    a bar-shaped light guide having a light-emitting surface and a bottom surface disposed opposite and parallel to the light-emitting surface, said light-emitting and bottom surfaces extending in a longitudinal direction of the guide, said light guide being housed in the casing to cause the light-emitting surface of the light guide to be exposed from the casing, and
    a light-emitting unit secured to an end section of the casing, wherein light from the light-emitting unit is introduced within the bar-shaped light guide through an end face thereof and then totally reflected within the bar-shaped light guide to be emitted through the light-emitting surface,
    a shielding section which covers an end section of the bar-shaped light guide at the end section of the casing close to the light-emitting unit and is provided on the light-emitting surface side of the bar-shaped light guide,
    a notch is formed at a corner of the light guide between the end face of the bar-shaped light guide and the light-emitting surface close to the light-emitting unit, and
    light from the light-emitting unit is reflected on a rear surface of the shielding section through a gap defined between the notch and the light-emitting unit to be introduced into the bar-shaped light guide, wherein
    the light-emitting unit includes light-emitting elements of three primary colors disposed along a single line extending perpendicular to a center line in a width direction of the bottom surface of the bar-shaped light guide.

2. An image scanning device comprising the illumination device according to claim 1 and an erecting unit magnification imaging system to cause the light reflected from a document of the light emitted from this illumination device to focus onto a line image sensor.

3. The image scanning device according to claim 2, wherein the erecting unit magnification imaging system has a focal depth of 1 mm or more and the illumination irregularity of the illumination device in the focal depth range is within +/−20%.

4. The illumination device of claim 1, wherein the casing has a substantially U-shaped cross-section.

5. The illumination device of claim 1, wherein the bottom surface of the bar-shaped light guide includes a light-scattering pattern formed thereon.

6. The illumination device of claim 1, wherein the end face of the bar-shaped light guide is at a longitudinal end of the light guide, and the light-emitting unit is spaced apart from and opposing the end face.

* * * * *

UNITED STATES PATENT AND TRADEMARK OFFICE
CERTIFICATE OF CORRECTION

PATENT NO. : 7,555,194 B2
APPLICATION NO. : 11/296866
DATED : June 30, 2009
INVENTOR(S) : Ikeda et al.

Figure 12:
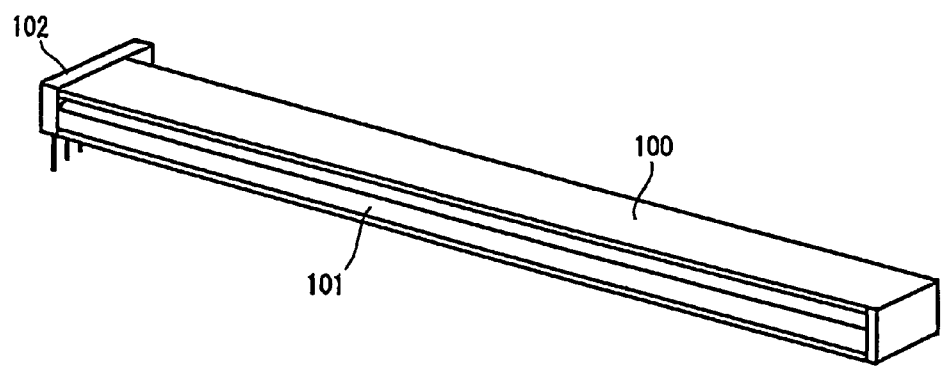
FIG. 12 is a perspective view of a conventional illumination device.
Figure 13:
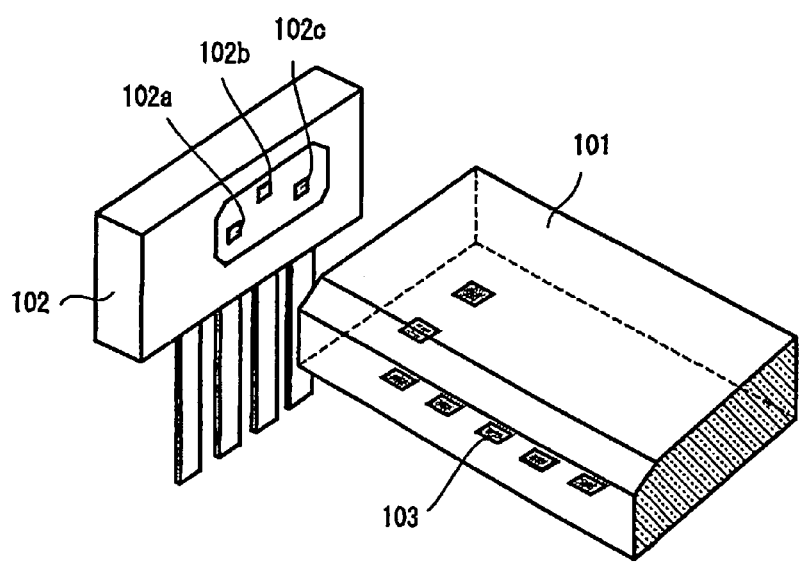
FIG. 13 is a perspective view showing a substantial part of the conventional illumination device.
Figure 14:
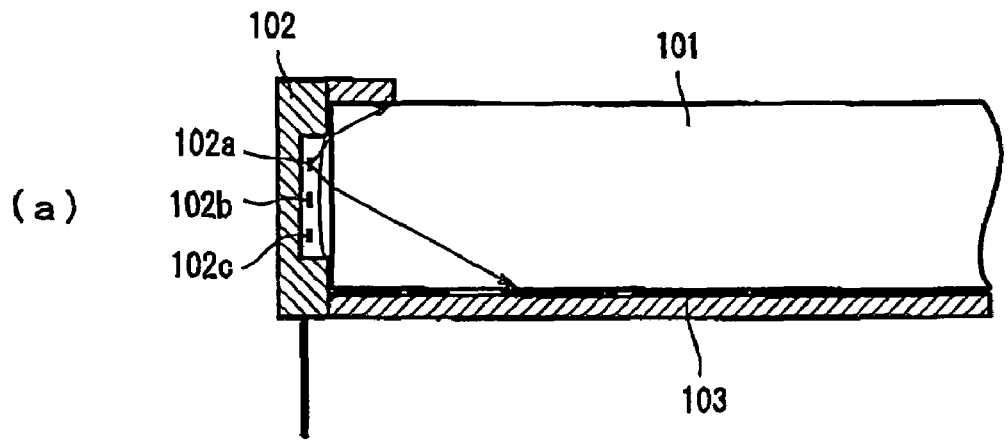
FIGS. 14 (*a*) through (*c*) are views describing the condition in which light from a blue-color light-emitting element, a red-color light-emitting element, and a green-color light-emitting element in a conventional illumination device is incident on a bar-shaped light guide.
Figure 14:
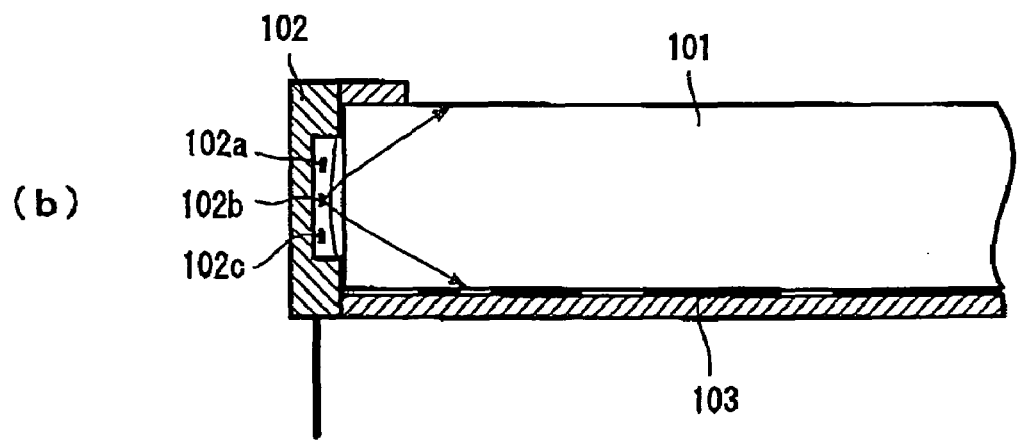
Figure 14:
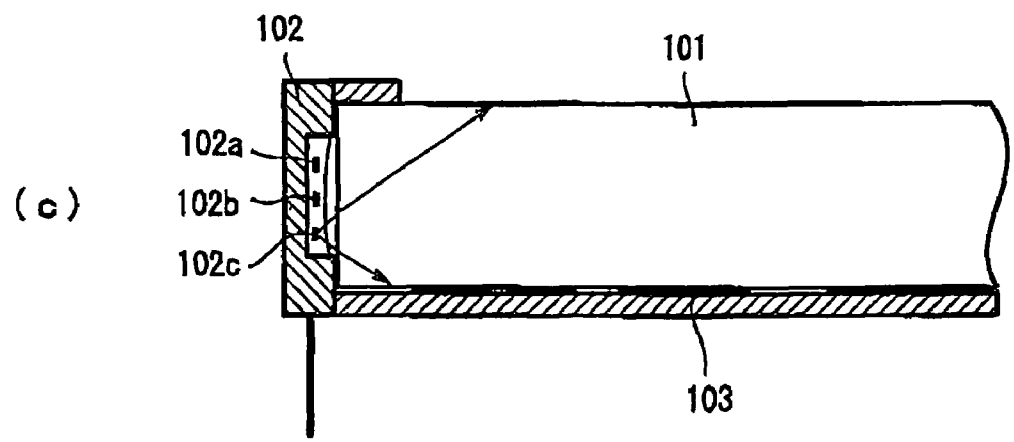

It is certified that error appears in the above-identified patent and that said Letters Patent is hereby corrected as shown below:

In the drawings:
  Sheet 3 of 10, FIG. 4, change figure label "(a)" to --FIG. 4(a)--, and change figure label "(b)" to --FIG. 4(b)--, as submitted in Preliminary Amendment-A to better comport with 37 CFR §1.84(u) drawing standards.
  Sheet 7 of 10, FIG. 11, change figure label "(a)" to --FIG. 11(a)--, change figure label "(b)" to --FIG. 11(b)--, and change figure label "(c)" to --FIG. 11(c)--, as submitted in Preliminary Amendment-A to better comport with 37 CFR §1.84(u) drawing standards.
  Sheet 8 of 10, FIG. 12, after "FIG. 12" insert --PRIOR ART-- (see Preliminary Amendment-A); and
       FIG. 13, after "FIG. 13" insert --PRIOR ART-- (see Preliminary Amendment-A).
  Sheet 9 of 10, FIG. 14, change figure label "(a)" to --FIG. 14(a)-- and below that insert --PRIOR ART--, change figure label "(b)" to --FIG. 14(b)-- and below that insert --PRIOR ART--, and change figure label "(c)" to --FIG. 14(c)-- and below that insert --PRIOR ART-- (see Preliminary Amendment-A).
  Sheet 10 of 10, FIG. 15, after "FIG. 15" insert --PRIOR ART-- (see Preliminary Amendment-A).

Column 1:
   Line 10, change "are incorporated" to --is incorporated--.
   Line 33, after "surface of the light guide" insert a --.--.
   Line 60, change "of light guide" to --of the light guide--.

Column 2:
   Line 35, change "the casing to cause a light-emitting" to --a casing to cause the light-emitting--.
   Line 54, change "elements and secured" to --elements secured--.

Column 3:
   Line 7, change "light guide is at least one of" to --light guide includes at least one of a--.

Signed and Sealed this

Twenty-eighth Day of September, 2010

David J. Kappos
*Director of the United States Patent and Trademark Office*

Column 4:
    Line 9, change "FIGS. 5 is a graph" to --FIG. 5 is a graph--.
    Lines 27-28, change "an end face of light guides of an illumination device" to --end faces of light guides of illumination devices--.

Column 5:
    Line 52, change "red-color element 10(*b*)" to --red-color element 10*b*--.
    Line 53, change "green-color element 10(*c*)" to --green-color element 10*c*--.

Column 6:
    Lines 6-17, delete the entire paragraph and replace it with:
--FIG. 7 is a view similar to FIG. 4 showing still another embodiment. FIG. 8 is a perspective view showing an end face of a light guide showing yet another embodiment, similar to the embodiment shown in FIG. 7. In these embodiments, the notch is not formed, but the end face of the bar-shaped light guide 3 is formed flat. A semispherical concave surface 15*a* is formed, as a part to enlarge the incident angle of the light incident on the bar-shaped light guide, on the surface of the end face facing the blue-color element 10*a*. Referring to the scattering pattern 11, a halved cylindrical concave surface is formed on the bottom surface 3*b* in the embodiment of FIG. 7. The embodiment of FIG. 8 includes a plurality of halved cylindrical concave surfaces 11*b* disposed along the bottom surface 3*b* of the light guide 3 that act as light scattering devices, in a similar manner to the painted light-scattering pattern 11 of the embodiment shown in FIG. 3. This arrangement of halved cylindrical concave surfaces 11*b* disposed on the bottom surface 3*b* of the light guide 3 is also shown in FIGS. 10 and 11.--.
    Lines 37-55, delete the entire paragraph and replace it with:
--FIGS. 10 and 11 are perspective views showing an end face of the light guide of the illumination device according to still further embodiment. In the embodiment as shown in FIG. 10, semispherical concave surfaces 15*a*, 15*b* and 15*c* are formed in association with a blue-color element 10*a*, a red-color element 10*b*, and a green-color element 10*c*, respectively. Especially in this embodiment, the diameter of the semispherical concave surface 15*a* corresponding to the blue-color element 10*a* of which the amount of light is apt to be shortest is made larger, the diameter of the semispherical concave surface 15*b* is made medium, and the diameter of the semispherical concave surface 15*c* is made smallest.--.